United States Patent [19]

Bradbury et al.

[11] 4,011,651

[45] Mar. 15, 1977

[54] FIBRE MASSES

[75] Inventors: John Albert Avery Bradbury; Matthew Giles Kendall, both of Runcorn, England

[73] Assignee: Imperial Chemical Industries Limited, London, England

[22] Filed: Feb. 22, 1974

[21] Appl. No.: 444,963

[30] Foreign Application Priority Data

Mar. 1, 1973 United Kingdom ............ 10013/73
Jan. 28, 1974 United Kingdom ............... 3941/74

[52] U.S. Cl. .................................. 29/424; 264/128
[51] Int. Cl.² ........................................ B23P 17/00
[58] Field of Search ................... 264/128, 120, 28; 52/232; 29/235, 423, 424, 451

[56] References Cited

UNITED STATES PATENTS 2,697,679  12/1954  Zimarik ............................ 264/128
3,649,406  3/1972  McNish ............................ 264/128

*Primary Examiner*—Robert F. White
*Assistant Examiner*—James R. Hall
*Attorney, Agent, or Firm*—Cushman, Darby & Cushman

[57] ABSTRACT

A method of constructing an assembly comprising an insulating fiber mass by pre-compressing the fiber mass to a controlled extent so that damage to the fibers is avoided, introducing the pre-compressed fiber mass into a cavity and releasing the pre-compression so that the fiber mass is retained under compression by the cavity wall.

15 Claims, No Drawings

FIBRE MASSES

This invention relates to a method of constructing an assembly of fibre masses and in particular of inorganic fibre masses for use in insulation.

Inorganic fibres are useful in providing insulation against vibration, for example in mounting a component in or on a vibrating support. They may also be used for sound insulation, for example as described in our copending UK patent application 55090/72, or for thermal insulation. Uncontrolled filling of spaces by inorganic fibres, each as is presently done in industrial insulation practice, leads to problems such as fibre breakage and non-uniformity of packing, and the overall packing density is generally not accurately known. The problem of breakage is especially acute for very fine fibres which are usually individually rather weak.

We have found (and this is the basis of our invention) that, when constructing an assembly comprising an insulating mass of compressed resilient inorganic fibres, improved performance of the product may be achieved by controlling the extent of compression of the fibres so that over-compression (and consequent fibre damage) is avoided.

According to one aspect of the invention there is provided a method of constructing an assembly comprising an insulating mass of compressed resilient inorganic fibres which comprises pre-compressing the fibre mass to a controlled extent, introducing the pre-compressed fibre mass into the desired location and releasing the pre-compression.

The invention is especially useful for the resilient mounting of a component in a cavity (for example mounting a catalyst-supporting matrix in the exhaust system of an internal combustion engine) or for the provision of a resilient compressed mass of fibre in a cavity as sound or thermal insulation.

Thus, according to a preferred aspect of the invention, there is provided a method of constructing an assembly comprising an insulating mass of compressed resilient inorganic fibre within a cavity which comprises pre-compressing the fibre mass to a controlled extent, introducing the pre-compressed fibre mass into the cavity and releasing the pre compression so that the fibre is retained under compression by the walls of the cavity.

The invention is applicable when using inorganic fibres since such fibres are generally particularly prone to significant damage on compression. Polycrystalline fibres are preferred to non-crystalline (i.e. vitreous) fibres as they are more readily and cheaply produced at the fine diameters and shot-free quality preferred, and have superior physical properties for example, 'resilience' (as hereinafter defined), especially when subjected to high temperatures.

We have found that fibres comprising one or more polycrystalline refractory metal oxides are especially suitable, as their physical properties make them capable of withstanding extremes of environmental conditions without serious loss of strength and 'resilience'. Vitreous fibres tend to de-vitrify under severe conditions of temperature or under the influence of other aggressive conditions. We prefer to use fibres comprising metal oxides or mixtures of oxides; for example, polycrystalline alumina, alumina/silica or zirconia fibres. Methods of preparing such fibres are disclosed in our copending United Kingdom Patent Applications Nos. 36693/72, 12088/72, 4369/71 and 29909/70. These disclosures are incorporated herein by reference. For completeness, we summarise below a preferred method of preparing certain metal oxide fibres. It is to be understood, however, that the applicability of method of the invention does not depend on the use of any particular inorganic fibres or on the method of preparation of the fibres used. Nevertheless, for the most efficient working of the invention it is preferred for the fibre blanket to have resilience properties which will ensure that the percentage 'spring-back' on release of pre-compression is as high as possible.

As disclosed in the above patent applications alumina or zirconia fibres may be formed by fibrising a composition having a viscosity of greater than 1 poise comprising an aqueous solution of a metal compound, for example an oxychloride, basic acetate, basic formate or nitrate of aluminium and/or zirconium, and a minor proportion of a water-soluble organic polymer, and, when alumina/silica fibres are required, a water-soluble organic silicon compound such as a polysiloxane, drying the fibre formed and heating to decompose the metal compound to oxide and to decompose the polymer. Heating in the presence of steam is often preferred.

Fibrising is preferably carried out by a blowing process which comprises extruding the fibrising composition through one or more apertures into at least one gas stream having a component of high velocity in the direction of travel of the extruded composition. The dimensions and shape of the said aperture may vary widely. We prefer to use an aperture having at least one dimension larger than 50 microns and smaller than 500 microns. The gas stream is preferably air, more preferably air at ambient temperature. It is convenient to employ two streams of gas which converge at or near the point where the composition is extruded from the aperture; preferably the angle between the converging gas streams is from 30° to 60°. At least part of the water in the composition is removed by the gas stream, and the rate of removal may conveniently be controlled by mixing the gas with the water vapour, for example air at a relative humidity of greater than 80% may be used. The velocity of the gas stream may be varied over wide limits, but we prefer to use velocities in the region of 200 to 1500 feet per second. The pressure employed to extrude the composition through the apertures will depend on the viscosity of the composition and on the desired rate of extrusion. We find that pressures from 16 to 100 pounds per square inch absolute are convenient for compositions having viscosities up to about 100 poise. This process produces fibres with a significant degree of 'kink' and it is believed that this 'kink' contributes significantly to the resilience of the fibre mass.

Although we prefer to use oxide fibres, the advantages of the invention may also be achieved when using other inorganic fibres, for example calcium or aluminium silicate fibres.

In general, whatever fibres are used, the average diameter and diameter distribution of the fibres are important in providing desired bulk properties in the fibre mass. Fine fibre diameters and relatively narrow diameter distributions are preferred. An average fibre diameter 0.5 to 5 microns is especially preferred; a diameter distribution which ensures that the fibre mass contains not greater than 30% by weight of fibres of greater diameter than 5 microns, or not greater than 20% by number of fibres of greater than 5 microns is also especially preferred. Relative freedom from shot, that is the substantial absence, for example less than 1% by weight, of material of a non-fibrous nature is a desirable property of fibres for use in the invention, as the presence of shot tends to increase the breakage of the fibres on pre-compression. Fibres of alumina or zirconia prepared as disclosed in UK patent applications 36693/72, 12088/72, 4369/71 and 29909/70 are especially useful therefore as fibres having these properties are readily obtained by the methods disclosed therein.

The fibres are conveniently used in a form known in the art as a fibre blanket.

The fibre mass may be pre-compressed in various ways, for example by needling or stitch-bonding the fibre mass between scrims, fleeces or webs of woven or non-woven fibres. Pre-compression may also be conveniently achieved by applying a removable binding agent (for example a chemical binding agent or a binding liquid preferably one having a high surface tension and capable of wetting the fibres such as water) to the fibre mass and mechanically compressing the fibre mass so that the binding agent retains the fibre mass in the pre-compressed state. Combinations of needling, stitch-bonding and the application of a binding agent may be used, for example needling in conjunction with the use of a bonding organic resin.

The needling of inorganic fibres with non-woven webs of organic fibres is described in our co-pending patent application No. 50313/73.

Suitable chemical binding agents are heat degradable or volatile compounds which can be removed from the fibrous mass by heating to temperatures up to 800° C. Thus are included heat degradable organic polymers such as thermoplastic and thermoset plastics and natural and synthetic elastomers. Plastics and elastomeric materials may conveniently be introduced into the fibre mass by in situ polymerisation, by being deposited from a solvent solution or from an aqueous dispersion or emulsion of the material. Descriptions of the organic materials referred to, their uses and the forms in which they are available may be found in for example 'Fibres, Films, Plastics and Rubbers' by W. J. Roff and J. R. Scott, Butterworths, London 1971. Especially preferred are aqueous dispersions of polymer precursors sometimes referred to as latices, in which the fibre mass is soaked and pre-compressed. The mass is then dried and cured so as to retain the compression of the fibre mass. A precipitating agent such as aluminium sulphate may be used in some cases to improve the uniformity of binder distribution. Uniform distribution of binder is desirable in order to obtain an effective compressive bond within the fibre mass with the use of minimum quantity of binder. Aqueous dispersions of starch, phenolic resin or urea-formaldehyde resin, acrylic resins and synthetic rubbers such as styrene/butadiene and carboxylated styrene/butadiene rubbers are preferred for the invention. Another preferred binder for the fibre mass is a solution of a phenol-formaldehyde or urea-formaldehyde resin in a solvent such as a ketone, for example acetone, or an alcohol, for example methyl alcohol or isopropyl alcohol. The fibre mass is soaked in the resin solution, pre-compressed to the desired shape and the solvent removed by evaporation. The resin-bonded fibre mass is then cured at a temperature of less than 150° C.

Binding liquids are preferably volatile and of high surface tension. The latter assists compression of the fibre mass by drawing the fibres together. Water is the preferred liquid. The fibre mass is wetted with the liquid, pre-compressed and introduced into the space to be filled.

The extent of pre-compression will depend, amongst other factors, on the physical properties of the fibre blanket employed and the desired degree of compression in the final assembly, but should be chosen and controlled to avoid excessive damage to the fibres. For preferred embodiments of the invention a fibre blanket is used which can be pre-compressed to a bulk density of about 2 to 20 times its original value and can recover substantially to this original value or to more than about 60% of it.

We have found that when using fine alumina or zirconia fibres described herein pre-compression to a density of between 2 and 30 pounds per cubic foot can be employed, and in some cases up to 8 pounds per cubic foot can be tolerated without significant fibre damage. For needled blankets using alumina or zirconia fibres a bulk density of 2 to 8 pounds per cubic foot is preferred; for resin bonded blankets 6 to 30 (and especially 10 to 25) pounds per cubic foot are preferred; and for water-bound blankets 6 to 20 (and especially 8 to 12) pounds per cubic foot are preferred.

The pre-compressed fibre mass is placed in the desired location and the pre-compression released.

When the fibre mass has been pre-compressed by needling or stitch bonding, the pre-compression may be released by heating to burn off the organic fibre scrims or webs applied in the compression process or to melt glass fibre cloth used in the same way. When the fibre mass has been bonded in the pre-compressed state by a thermally-decomposable bonding agent (for example a phenolic resin) the fibre mass may be heated to decompose the bonding agent and release the compression. Burning-off or otherwise thermally decomposing the organic materials is done at any convenient temperature for such processes to occur. It is found, for example, that exposure to a temperature of about 150° C to 450° C for up to 16 hours is convenient. When a volatile liquid, for example water, has been used as bonding agent, the compression is conveniently released by driving off the liquid by relatively gentle heating or the application of vacuum. Heating at about 120° C for up to 16 hours is typically used in these cases. Similarly, when the fibre mass has been bonded in the pre-compressed state by a soluble chemical bonding agent, the fibre mass may be washed with a solvent which dissolves the bonding agent.

On release of the pre-compression, the fibre mass will, unless otherwise constrained (for example by cavity walls), expand. In any particular application, the volume of the fibre mass used is selected so that, on release of the pre-compression in the desired location, the fibre mass is still retained under compression, that is, the fibres still retain residual strain. The compression of the fibres in the final assembly will usually be retained by the walls surrrounding the fibre mass but may be retained in other ways, for example by metal bonds wrapped round the fibre mass.

The performance of insulating fibre masses and their tendency to deteriorate in use depends on the strain in the fibre mass during use. The amount of residual strain which gives the optimum performance and lifetime will depend on:

1. the function of the fibre mass and the conditions of use
2. the nature of the fibres The choice of fibre for any particular application and the degree of compression which gives optimum results may be determined by simple tests. For example, the fibre may be placed between pairs of parallel plates which are oscillated at various amptitudes and frequencies to determine, for each set of conditions, the degree of compression which gives the best result. In such a test, samples of an aluminosilicate fibre (commercially available as 'Fiberfrax' H) was compared with a zirconia fibre (commmercially available as 'Saffil') by subjecting each respectively to an oscillating compressive force at 6 cycles per minute at room temperature. Each cycle consisted of a compression phase during which the fibre blanket at a bulk density of 6 pounds per cubic foot was comprised from a thickness of 2 inches to 1 inch and a recovery phase during which the compression force was removed. After 30 cycles, the aluminosilicate fibre was permanently compressed and did not recover to a thickness greater than 1 inch, whereas the zirconia fibre, after 1700 cycles, showed no permanent set and was still at its original bulk density of 6 pounds per cubic foot.

As the invention is especially useful for fibre masses used in high temperature insulation applications, compression tests at high temperature are appropriate for selecting a fibre suitable for such applications. For example, blankets of zirconia fibre (commercially available as 'Saffil') and aluminosilicate fibre, both having an original bulk density of 6 pounds per cubic foot were exposed to temperature of 1000° C for one hour while under compression such that the thickness of the blankets was one quarter of their original thickness of 4 inches. On removal of the compression load, the zirconia fibre blanket immediately recovered to more than 75% of its original thickness, whereas the aluminosilicate blanket showed no recovery at all.

For most purposes, it is satisfactory and convenient to employ a simple static compression test at room temperature. The choice of a suitable inorganic fibre can then be made on the basis of the value of 'resilience' of the fibre mass, 'resilience' being defined herein as the amount of recovery of a fibre mass after compression for 2 minutes to 50% of its original thickness expressed as a percentage of the original thickness. For many embodiments of the invention a resilience of greater than 60% is preferred. Alumina and zirconia fibres prepared as described herein have 'resilience' values of 72 to 88%; when compressed to give a five-fold increase in bulk density the percentage recovery is substantially unchanged, thus making them very suitable for the invention.

The invention thus further provides a method for assembly a mass of resilient inorganic fibres, the degree of compression of the fibres being pre-determined such that the strain in the fibre mass is sufficiently high to ensure that the fibre mass is substantially held in place within the assembly in use. In preferred assemblies, the inorganic fibres have a resilience (as defined herein) of greater than 60%. Alumina and zirconia fibre are most preferred as they have resilience values of at least 72%. The degree of compression preferred in most assemblies is from 2 to 20 times the original bulk density of the inorganic fibre.

The invention therefore provides a convenient method for introducing an insulating mass of fibre into a space or cavity through an aperture and at the same time achieve a substantially uniform distribution of bulk density of the fibre within the space or cavity. For some embodiments, it is possible to pre-form the fibre mass to a shape which is especially suited to the space to be filled. Handling of the fibre is easier and less loose fibre escapes in the process of filling. The invention is thus especially suitable for installing acoustic insulation into engine duct linings for example in aircraft, and for providing thermal insulation in-fill systems for double-skinned constructions, for example railway coaches. The full advantage of the invention is achievable with the most resilient inorganic fibres such as zirconia and alumina as herein described.

The invention is illustrated by, but not limited to, the following Examples.

EXAMPLE 1

This example describes the use of a fibre mass in accordance with the invention to support a catalyst matrix in an exhaust system. The fibre mass serves to thermally insulate the matrix, and also to insulate it from vibration.

A cylindrical matrix (6 inches long × 4 inches diameter) was wrapped in a ½ inch thick zirconia blanket which had been produced by needling a mass of fine zirconia fibres (prepared as described herein) to give a product having a density of 4 pounds per cubic foot in the needled condition. The wrapped matrix was inserted in a 5 inch internal diameter pipe and the whole unit was fired at a temperature of 180° C. The firing destroyed the organic scrims holding the fibre in the needled condition and released the pre-compression. On release of the pre-compression, the fibre was retained in a compressed state by the pipe wall. The pipe was then connected as part of the exhaust system of a petrol engine connected to a dynamometer as a static automobile test bed. The engine was operated over a range of speed and load for a period of about 14 hours. The pipe was removed and the fibre mass visually examined; no damage to the fibres was observed.

EXAMPLE 2

This example describes the use of a fibre mass in accordance with the invention to make a repair to a glass melting furnace roof while the furnace was in operation. Localised deterioration of the sprung arch refractory roof caused an irregularly shaped hole of 2 inches mean diameter to develop through which flames could pass.

A cylindrical bundle of zirconia fibre mat was wetted with water and compressed to 8 pounds per cubic foot and a diameter of 1½ inches while squeezing out the excess water. In order to ease the handling and aid retention of the compression the cylinder was enclosed in a sleeve made from glass fibre cloth and dried at 80° C. Upon insertion into the hole in the furnace roof the glass cloth melted and the zirconia fibre expanded to fill the available space thus creating an effective seal in spite of the irregular shape of the hole. The repair was completed by a cap of castable refractory cement.

EXAMPLE 3

This Example describes the use of a wetted fibre mass in accordance with the invention to support a catalyst matrix in an exhaust system.

A strip of 'Saffil' zirconia fibre blanket (bulk density 1.2 lbs/cu. ft. and thickness 1 inch) was wetted by water and pressed alternatively several times until it had a bulk density of about 10 lbs/cu. ft. A catalyst matrix 4.5 inches long and 4 inches diameter was wrapped circumferentially with this strip to give a total thickness of about ¼ inch around the matrix. Further pressure was applied to the fibre to increase its density to about 12 lbs/cu. ft. The diameter of the wrapped matrix was such that it was just able to be inserted into the cylindrical matrix container. After insertion the whole structure was heated at 120° C for 16 hours to drive off the water from the fibre. After this drying the blanket between the matrix and the container had a bulk density of 10 to 12 lbs/cu. ft. and exerted a restraining force of 0.5 to 1.0 lbs/sq. inch over the peripheral matrix surface.

EXAMPLE 4

This Example describes the use of a resinated fibre mass in accordance with the invention to support a catalyst matrix in an exhaust system.

A 'Saffil' zirconia blanket as used in Example 3 was impregnated with a 4% by weight aqueous dispersion of a phenolic resin (BXL R10993) and formed into a 6 inch long tube of 4.66 inches internal diameter 5.0 inches external diameter in a suitable mould. the 'green' tube was dried at 90° C and cured in air at 140° C. The fibres, thus bound by resin, had a bulk density of about 14 lbs/cu. ft. This tube fitted tightly over a catalyst matrix and was able to slip relatively easily into the container for the matrix. The assembled structure was heated at 450° C for 16 hours, to burn out the resin. The fibres left had a bulk density of 10 to 12 lbs/cu. ft. and exerted a restraining force of 0.5 to 0.7 lbs/sq. inch over the peripheral surface of the matrix.

EXAMPLE 5

This Example illustrates the use of the invention to provide insulation to fill the annular space between a burner tube and an outer metal sleeve of a lime-burning furnace to prevent damage to the sleeve. A zirconia fibre insert for this assembly was prepared as follows:

A quantity of zirconia fibre mat was weighed out sufficient to fill the whole of the annular space at a density of 15 lbs/cu. ft. This fibre was then soaked in a 4% aqueous dispersion of phenolic resin (BXL R10993) and afterwards compressed to a tubular form, dried at 20° C and then air cured at 140° C. The resulting resin bonded tube was of 20 lbs/cu. ft. density and was an easy sliding fit into the rough finished annular space round the burner tube. When the furnace was started up the resin binder was burnt off and the zirconia fibre expanded to occupy the whole of the available space around the burner so as to make a firm vibration-resistant support for it and a good gas seal in spite of the irregular shape of the space to be filled. The final density of the fibre fill was 15 lbs/cu. ft.

What we claim is:

1. A method of constructing an assembly comprising an insulating mass of polycrystalline inorganic fibre within a cavity which comprises pre-compressing the fibre mass to a bulk density of 2 to 20 times its original bulk density by applying a removable binding agent to the fibre mass and mechanically compressing the fiber mass so that the binding agent retains the fibre mass in the pre-compressed state, introducing the pre-compressed fibre mass into the cavity and subsequently heating the fibre mass to remove the binding agent so that the pre-compression is released and the fibre is retained under compression by the walls of the cavity.

2. A method as claimed in claim 1 wherein the fibre mass comprises at least one refractory metal oxide.

3. A method as claimed in claim 1 wherein the fibre mass comprises a member selected from the group consisting of alumina, alumina/silica and zirconia.

4. A method as claimed in claim 1 wherein the fibres in said fibre mass have an average diameter from 0.5 to 5 microns.

5. A method as claimed in claim 1 wherein the fibre mass contains not greater than 30% by weight of fibres of diameter greater than 5 microns.

6. A method as claimed in claim 1 wherein the removable binding agent is a chemical binding agent.

7. A method as claimed in claim 6 wherein the chemical binding agent is a heat degradable organic polymer.

8. A method as claimed in claim 7 wherein a precursor of the polymer is in solution or an aqueous dispersion.

9. A method as claimed in claim 7 wherein the polymer is a phenolic resin.

10. A method as claimed in claim 7 wherein the polymer is selected from the group consisting of starch, urea-formaldehyde resin, an acrylic resin and a synthetic rubber.

11. A method as claimed in claim 3 wherein the fibre mass is compressed to a bulk density of 2 to 30 pounds per cubic foot.

12. A method as claimed in claim 11 wherein the bulk density is from 2 to 8 pounds per cubic foot.

13. A method as claimed in claim 1 wherein heating is at a temperature of 150° C to 450° C for up to 16 hours.

14. A method as claimed in claim 1 wherein the fibre mass is pre-compressed by needling the fibre mass between woven or non-woven webs and the pre-compression is released by firing to destroy the webs holding the mass in the needled condition.

15. A method as claimed in claim 1 wherein the fibre mass is pre-compressed by stitch bonding the fibre mass between woven or non-woven webs and the pre-compression is released by firing to destroy the webs holding the mass in the stitch bonded condition.

* * * * *